(12) United States Patent
Moore et al.

(10) Patent No.: US 11,739,506 B2
(45) Date of Patent: Aug. 29, 2023

(54) WATER RECOVERY SYSTEM INCLUDING INTEGRATED CONTACTOR WITH THERMALLY-ENHANCED RECOVERY

(71) Applicant: General Electric Company, Schenectady, NY (US)

(72) Inventors: David Roger Moore, Rexford, NY (US); Vitali Victor Lissianski, Schenectady, NY (US); Albert Santo Stella, Voorheesville, NY (US); Daniel Jason Erno, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 157 days.

(21) Appl. No.: 17/168,845

(22) Filed: Feb. 5, 2021

(65) Prior Publication Data
US 2022/0251810 A1    Aug. 11, 2022

(51) Int. Cl.
*B01D 53/04* (2006.01)
*E03B 3/28* (2006.01)
*B01D 53/26* (2006.01)

(52) U.S. Cl.
CPC ............ *E03B 3/28* (2013.01); *B01D 53/0407* (2013.01); *B01D 53/0454* (2013.01); *B01D 53/261* (2013.01); *B01D 2257/80* (2013.01)

(58) Field of Classification Search
None
See application file for complete search history.

(56) References Cited

U.S. PATENT DOCUMENTS

| 6,336,957 B1 | 1/2002 | Tsymerman |
| 7,000,410 B2 | 2/2006 | Hutchinson |

(Continued)

FOREIGN PATENT DOCUMENTS

| EP | 0232840 A2 | 8/1987 |
| EP | 3653282 A1 | 5/2020 |

(Continued)

OTHER PUBLICATIONS

Shi, Xiaoyang, et al., "Sorbents for the Direct Capture of CO2 from Ambient Air", Angewandte Chemie International Edition, vol. 59, Issue:18, pp. 1-25.

(Continued)

*Primary Examiner* — Jonathan Miller
(74) *Attorney, Agent, or Firm* — Fletcher Yoder, P.C.

(57) ABSTRACT

A water recovery system including a first fluid stream inlet providing for the flow of a first fluid stream, such as a humidified inlet gas, into the system and a second fluid stream inlet providing for the flow of a second fluid stream, such as a gas having a temperature greater than the humidified inlet gas, into the system. At least one contactor is in fluid communication with the first fluid stream inlet and the second fluid stream inlet. The at least one contactor defining therein a first fluidically-isolated, sorbent-integrated, fluid domain for flow of the first fluid stream and water adsorption, a second fluidically-isolated fluid domain for flow of the second fluid stream wherein the second fluidically-isolated fluid domain is in thermal communication with the first fluidically-isolated, sorbent-integrated, fluid domain and a third fluidically-isolated fluid domain for capture of a condensate and recycling of latent heat of condensation back to the first fluidically-isolated, sorbent-integrated, fluid domain.

20 Claims, 3 Drawing Sheets

(56) References Cited

U.S. PATENT DOCUMENTS

| | | | |
|---|---|---|---|
| 8,163,066 | B2 | 4/2012 | Eisenberger |
| 10,279,306 | B2 | 5/2019 | Gebald et al. |
| 10,683,644 | B2 | 6/2020 | Kim et al. |
| 2007/0028769 | A1* | 2/2007 | Eplee .................... B01D 53/06 95/113 |
| 2008/0289495 | A1 | 11/2008 | Eisenberger et al. |
| 2010/0024651 | A1 | 2/2010 | Bansal |
| 2014/0271420 | A1 | 9/2014 | Kirchman |
| 2016/0109143 | A1 | 4/2016 | Kogan et al. |
| 2017/0203249 | A1 | 4/2017 | Gebald et al. |

FOREIGN PATENT DOCUMENTS

| | | |
|---|---|---|
| WO | 2013117827 A1 | 8/2013 |
| WO | 2015005791 A1 | 1/2015 |
| WO | 2019082000 A1 | 5/2019 |
| WO | 2019161114 A1 | 8/2019 |
| WO | 2019191651 A2 | 10/2019 |
| WO | 2020113281 A1 | 6/2020 |

OTHER PUBLICATIONS

Lackner, K.S,, "Capture of carbon dioxide from ambient air", The European Physical Journal Special Topics 176, 2009.
Samari, M., Ridha, F., Manovic, V. et al., "Direct capture of carbon dioxide from air via lime-based sorbents", Mitig Adapt Strateg Glob Change 25, 25-41 (2020).

* cited by examiner

WATER RECOVERY SYSTEM INCLUDING INTEGRATED CONTACTOR WITH THERMALLY-ENHANCED RECOVERY

This invention was made with Government support under Contract Number HR0011-21C-0020 awarded by the DEFENSE ADVANCED RESEARCH PROJECTS AGENCY

BACKGROUND

Embodiments of the present disclosure relate to a water recovery system and more particularly, to a water recovery system including at least one contactor to extract water from air using sorbents and thermally-enhanced recovery efforts.

According to the World Health Organization, 4 billion people—more than half the world's population—do not have sufficient potable water for at least one month each year, and 500 million of this group do not have enough throughout the entire year. Creating potable water from air is a promising approach to ease the water scarcity problem. Existing technologies to extract water from air include dehumidification using salts or sorbents. However, these approaches are energy intensive and do not operate at low air humidity levels.

It may therefore be desirable to develop novel water recovery system capable of producing potable water from moisture in the air that advantageously requires low energy and can operate at humidity typical for arid environments (e.g., desert air).

BRIEF DESCRIPTION

In accordance with aspects of the present disclosure, a novel water recovery system is presented. The novel water recovery system includes at least one contactor for the extraction of water using sorbents and thermally-enhanced recovery. The system includes a first fluid stream inlet providing for the flow of a first fluid stream into the water recovery system and a second fluid stream inlet providing for the flow of a second fluid stream into the water recovery system, and at least one contactor in fluid communication with the first fluid stream inlet and the second fluid stream inlet. The first fluid stream comprising a humidified inlet gas, and the second fluid stream comprising a gas having a temperature greater than the humidified inlet gas. The at least one contactor defining therein: a first fluidically-isolated, sorbent-integrated, fluid domain for flow of the first fluid stream and water adsorption; a second fluidically-isolated fluid domain for flow of the second fluid stream to assist in desorption via transfer of heat to the first fluidically-isolated, sorbent-integrated, fluid domain; and a third fluidically-isolated fluid domain for capture of a condensate and recycling of latent heat of condensation back to the first fluidically-isolated, sorbent-integrated, fluid domain to further drive desorption.

In accordance with another aspect of the present disclosure, a novel water recovery system is presented. The novel water recovery system includes at least one contactor for the extraction of water using sorbents and thermally-enhanced recovery. The system includes a first fluid flow path providing for the flow of a first fluid stream into the water recovery system and a second fluid flow path providing for the flow of a second fluid stream into the water recovery system, a first contactor in fluid communication with the first fluid flow path and the second fluid flow path and a second contactor in fluid communication with the first fluid flow path and the second fluid flow path, wherein the first contactor and the second contactor operate in alternative cycles for continuous operation. The first fluid stream comprises the humidified inlet gas and the second fluid stream comprises a gas having a temperature greater than the humidified inlet gas. Each of the first and second contactors defining therein: a first fluidically-isolated, sorbent-integrated, fluid domain for flow of the first fluid stream and water adsorption; a second fluidically-isolated fluid domain for flow of the second fluid stream to assist in desorption via transfer of heat to the first fluidically-isolated, sorbent-integrated, fluid domain; and a third fluidically-isolated fluid domain for capture of a condensate and recycling of latent heat of condensation back to the first fluidically-isolated, sorbent-integrated, fluid domain to further drive desorption.

In accordance with yet another aspect of the present disclosure, a novel method for removing water from a humidified inlet gas is presented. The novel method includes providing a first contactor in fluid communication with a first fluid flow path and a second contactor in fluid communication with a second fluid flow path. The first contactor and the second contactor operate in alternative cycles for continuous operation of a water recovery system. The method further including inputting a first fluid stream into the first fluid flow path of the water recovery system, inputting a second fluid stream into the second fluid flow path of the water recovery system, operating the first contactor in fluid communication with the first fluid flow path in one of an adsorption cycle or a desorption cycle and simultaneously operating the second contactor in fluid communication with the second fluid flow path in the other of the adsorption cycle or the desorption cycle, providing continuous operation of the water recovery system, The first fluid stream comprises the humidified inlet gas and the second fluid stream comprises a gas having a temperature greater than the first fluid stream. Each of the first and second contactors comprise: a first fluidically-isolated, sorbent-integrated, fluid domain for flow of the first fluid stream and water adsorption; a second fluidically-isolated fluid domain for flow of the second fluid stream to assist in desorption via transfer of heat to the first fluidically-isolated, sorbent-integrated, fluid domain; and a third fluidically-isolated fluid domain for capture of a condensate and recycling of latent heat of condensation back to the first fluidically-isolated, sorbent-integrated, fluid domain to further drive desorption.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

DRAWINGS

These and other features, aspects, and advantages of the present disclosure will become better understood when the following detailed description is read with reference to the accompanying drawings in which like characters represent like parts throughout the drawings, wherein.

Figure 1:
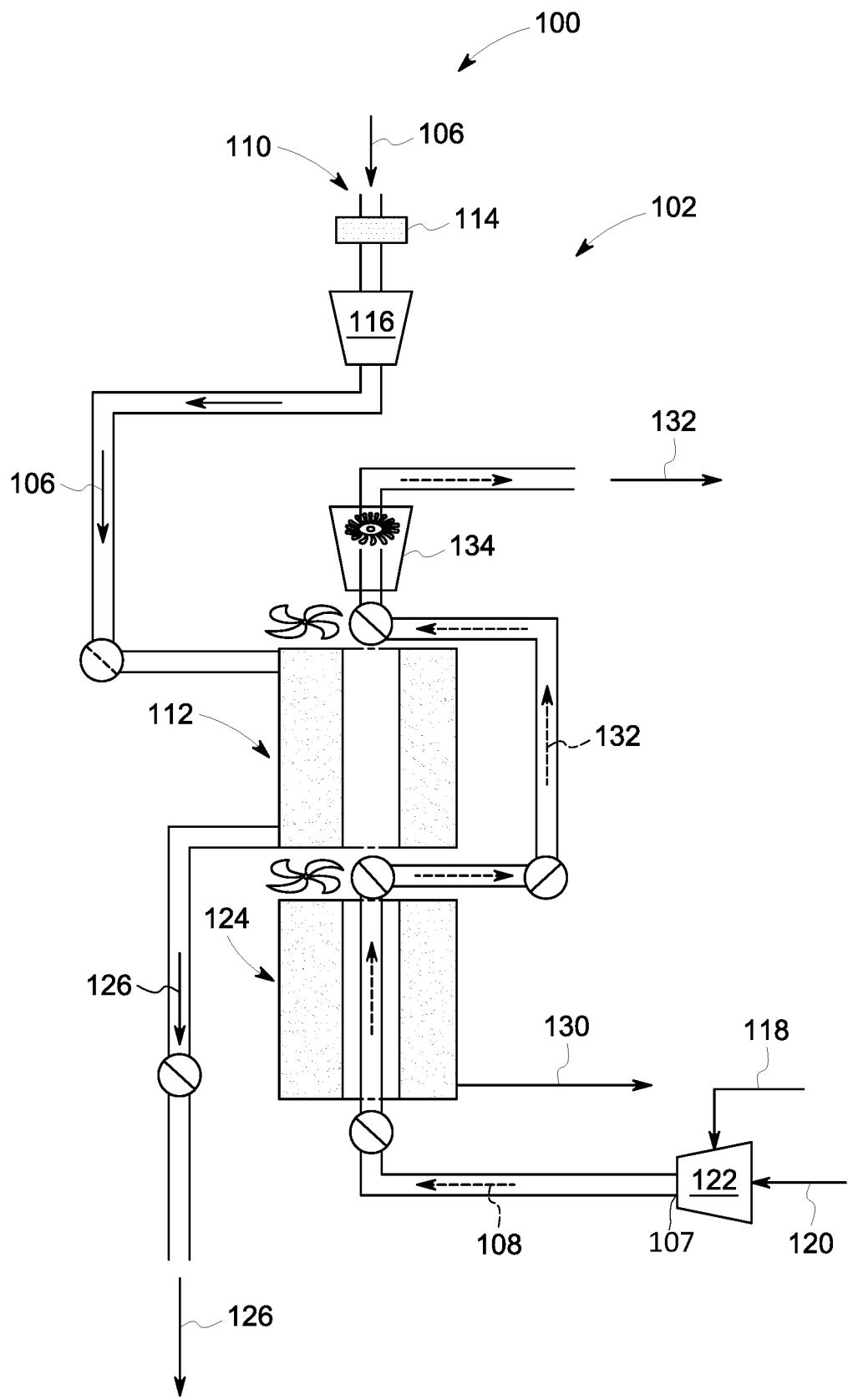
FIG. 1 is a schematic view of a first cycle in an exemplary water recovery system for recovering water from a humidified inlet gas, in accordance with one embodiment of the present disclosure.

Repeat use of reference characters in the present specification and drawings is intended to represent the same or analogous features or elements of the embodiment shown.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "fluid" includes any medium or material that flows, including, but not limited to, air, gas, liquid, and steam.

As will be described in detail hereinafter, various embodiments of a novel water recovery system are presented. The novel water recovery system includes at least one contactor for the extraction of water from a surrounding fluid, such as ambient air, using sorbents and thermally-enhanced recovery efforts. The disclosed system solves the problem of high water extraction costs by integrating a sorbent with a contactor and through the use of effective energy recuperation. The high surface area, sorbent-integrated contactor is a key contributor to the system performance. The contactor features a unique, trifurcating design that contains three fluidically-isolated, independent, massively parallel fluid domains: a) a first fluidically-isolated, sorbent-integrated, fluid domain that provides for flow of ambient air and water adsorption from that ambient air flow; b) a second fluidically-isolated fluid domain, also called a hot air fluid domain, that provides for flow of a hot air fluid to promote desorption via transfer of sensible heat to the sorbent-integrated fluid domain; and c) a third fluidically-isolated fluid domain to capture water condensate and efficiently recycle the latent heat of condensation back to the sorbent-integrated fluid domain to further drive desorption. During sorbent regeneration, heat from the second domain causes moisture release from the sorbent-integrated fluid domain, which is then condensed in the third fluid domain of the contactor. Heat released during water condensation is recuperated from the third fluid domain to the first fluid domain, and is used for sorbent regeneration along with the additional heat supplied to the sorbent from the second fluid domain.

Figure 2:
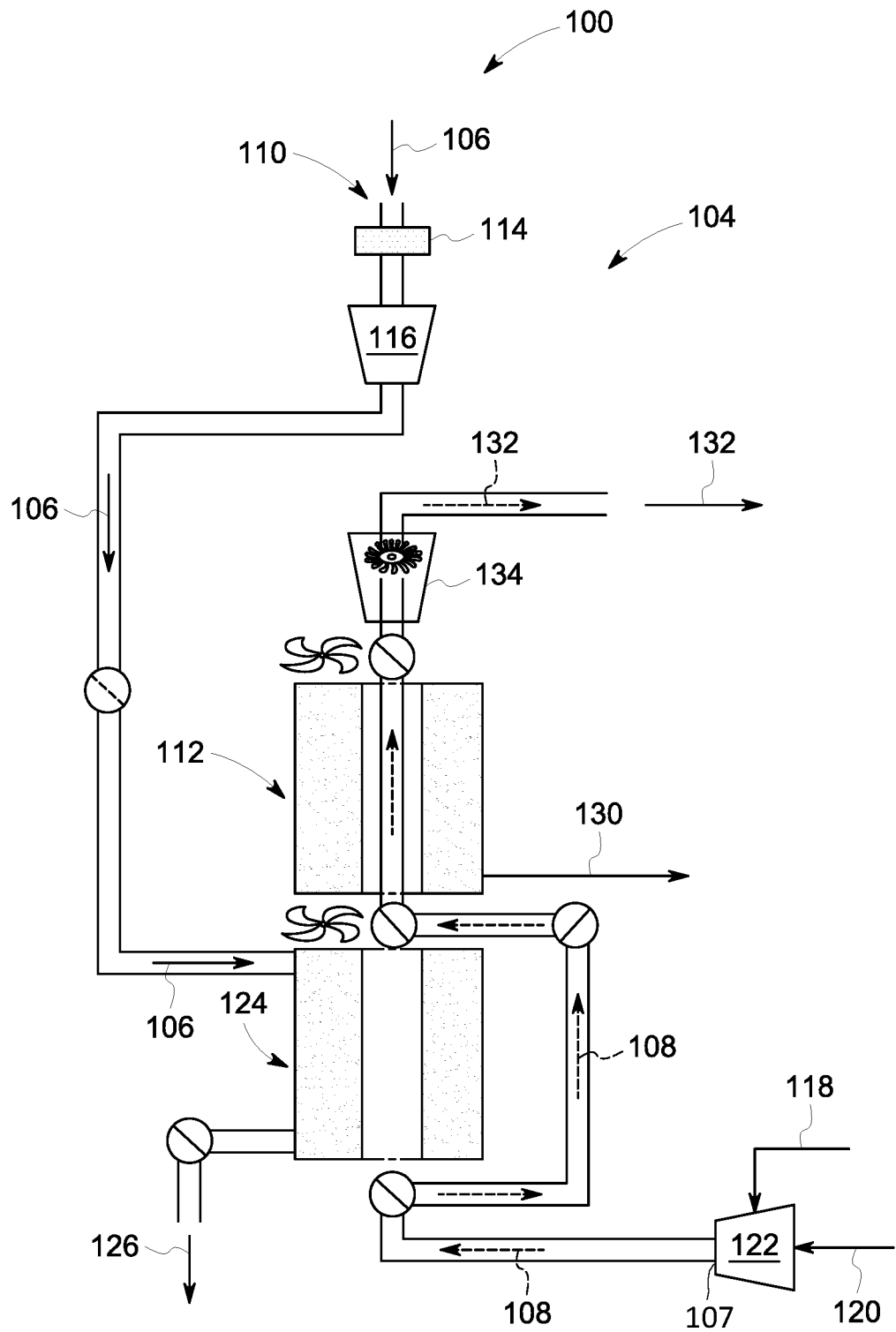
FIG. 2 is a schematic view of a second cycle in the exemplary water recovery for recovering water from a humidified inlet gas, in accordance with one embodiment of the present disclosure.

Referring now to FIGS. 1 and 2, illustrated is an exemplary embodiment of a water recovery system 100 that functions as a water absorption unit in an engine system. The water recovery system 100 is configured to remove water from a surrounding humidified environment, such as ambient air or other suitable source of air, or other fluid, that comprises water vapor, utilizing combustion gases generated during engine (e.g., internal combustion engine, gas turbine) operation to assist with desorption. Alternatively, the water recovery system 100 may operate in an adsorption or desorption mode. The water recovery system 100 of FIGS. 1 and 2 incorporates two contactors (described presently) to provide for continuous operation. FIG. 1 illustrates the water recovery system 100 during operation in a first cycle 102 (Cycle A—described presently). FIG. 2 illustrates the water recovery system 100, during operation in a second cycle 104 (Cycle B—described presently).

The water recovery system 100 is configured to remove water from a humidified inlet gas stream 106, such as ambient air. With the lack of sufficient potable water for many in the world, it is becoming increasingly important to cheaply and effectively remove water from ambient air. The water recovery system 100 disclosed herein solves the problem of high water extraction costs by integrating a sorbent with at least one, and preferably two or more, contactors (described presently) and by applying effective energy recuperation. A high surface area sorbent-integrated contactor and low pressure drop across the contactor are key contributors to the performance of the water recovery system 100. The water recovery system 100 provides effective energy recuperation by utilizing a hot gas stream 108, having a temperature greater than the humidified inlet gas stream 106. The hot gas stream originates from a source of heated fluid, such as, but not limited to, a gas turbine or internal combustion engine that can provide exhaust gases after natural gas, or some other combustive fuel, is ignited in the engine. Heat from the hot gas stream 108 assists in desorption via transfer of heat to a fluidically-isolated, sorbent-integrated, fluid domain (described presently) defined within the water recovery system 100. The engine also provides mechanical or electrical power for an optional blower 116 that moves humidifies gas through the respective contactor.

As illustrated in FIGS. 1 and 2, the water recovery system 100 comprises a first fluid stream, and more particularly, the humidified inlet gas stream 106, that enters the water recovery system 100 at an inlet 110. In an embodiment, the humidified inlet gas stream 106 may be cooled first in order to help reduce the volume of the gas, and therefore, to reduce the size and weight of the water recovery system 100. The humidified inlet gas stream 106 is fed into a first contactor 112. In the illustrated embodiment, the humidified inlet gas stream 106 passes through an optional filter 114 and the optional blower 116 prior to reaching the first contactor 112.

In the illustrated embodiment, exhaust gas, and more particularly the hot gas stream 108, is created after natural gas, or some other combustive fuel 118 and air 120, are ignited in an engine 122 for energy. After being combusted in the engine 122, the exhaust gas stream, and more particularly, the hot gas stream 108 is fed into a second contactor 124. Optionally, the hot gas stream may be mixed with air prior to entering the contactor to lower the stream temperature. Again, the water recovery system 100 is configured to remove the water from the humidified inlet gas stream 106, assisted by the heat from the hot gas stream 108.

As previously stated, the water recovery system 100 includes two contactors, and more particularly the first contactor 112 and the second contactor 124 to provide alternating adsorption and desorption cycles (FIG. 1—Cycle A and FIG. 2—Cycle B) for continuous moisture removal from the humidified inlet gas stream 106. More particularly, in the described embodiment, during Cycle A, as best illustrated in FIG. 1, the first contactor 112 serves as an adsorption unit with the humidified inlet gas stream 106 passing through the first contactor 112 and the second contactor 124 serves as a desorption unit with the hot gas stream 108 passing through the second contactor 124. As stated, for continuous moisture removal, when the first contactor 112, and more particularly, when the adsorption materials are spent within the first contactor 112, the first contactor 112 acts as a desorption unit, as best illustrated in FIG. 2, and the second contactor 124 acts as an absorption unit. In this way, continuous water production from the air is achieved.

During operation, the humidified inlet gas stream 106 exits the adsorption contactor as a dry gas exhaust stream 126 at the lower portion of the water recovery system 100, and can be vented via an outlet 128 to atmosphere or further treated or recycled for energy recovery. During Cycle A operation, as shown in FIG. 1, when the first contactor 112 is acting as an adsorption unit and the second contactor 124 is acting as a desorption unit, the dry gas exhaust stream 126 is vented from the first contactor 112 and a purified water stream 130 exits a lower portion of the second contactor 124 and continues on for further treatment, such as additional purification. During Cycle B operation, as shown in FIG. 2, when the first contactor 112 is acting as an desorption unit and the second contactor 124 is acting as an adsorption unit, the dry gas exhaust stream 126 is vented from the second contactor 124 and the purified water stream 130 exits a lower portion of the first contactor 112 and continues on for further treatment, such as additional purification, and the like.

In addition, during operation the hot gas stream 108 having a temperature greater than the humidified inlet gas stream 106, passes through the second contactor 124 (Cycle A) or the first contactor 112 (Cycle B) to assist in desorption via the transfer of heat to a first fluidically-isolated, sorbent-integrated, fluid domain in the respective contactor (described presently). The hot gas stream 108 exits the water recovery system 100 as a cooled engine exhaust stream 132. In an embodiment, an expander 134 is included and provide additional power for the water recovery system 100 components.

The water recovery system 100 is shown in FIGS. 1 and 2 in cutaway to reveal the individual contactors 112, 124 and flow of the fluid streams therethrough. The water recovery system 100 can contain a single contactor or multiple contactors, and the number of contactors selected for use in a given system will depend at least in part on the concentration of water in the humidified inlet gas stream 106, the volume of the hot gas stream 108, the desire for continuous operation, and the like.

Figure 3:
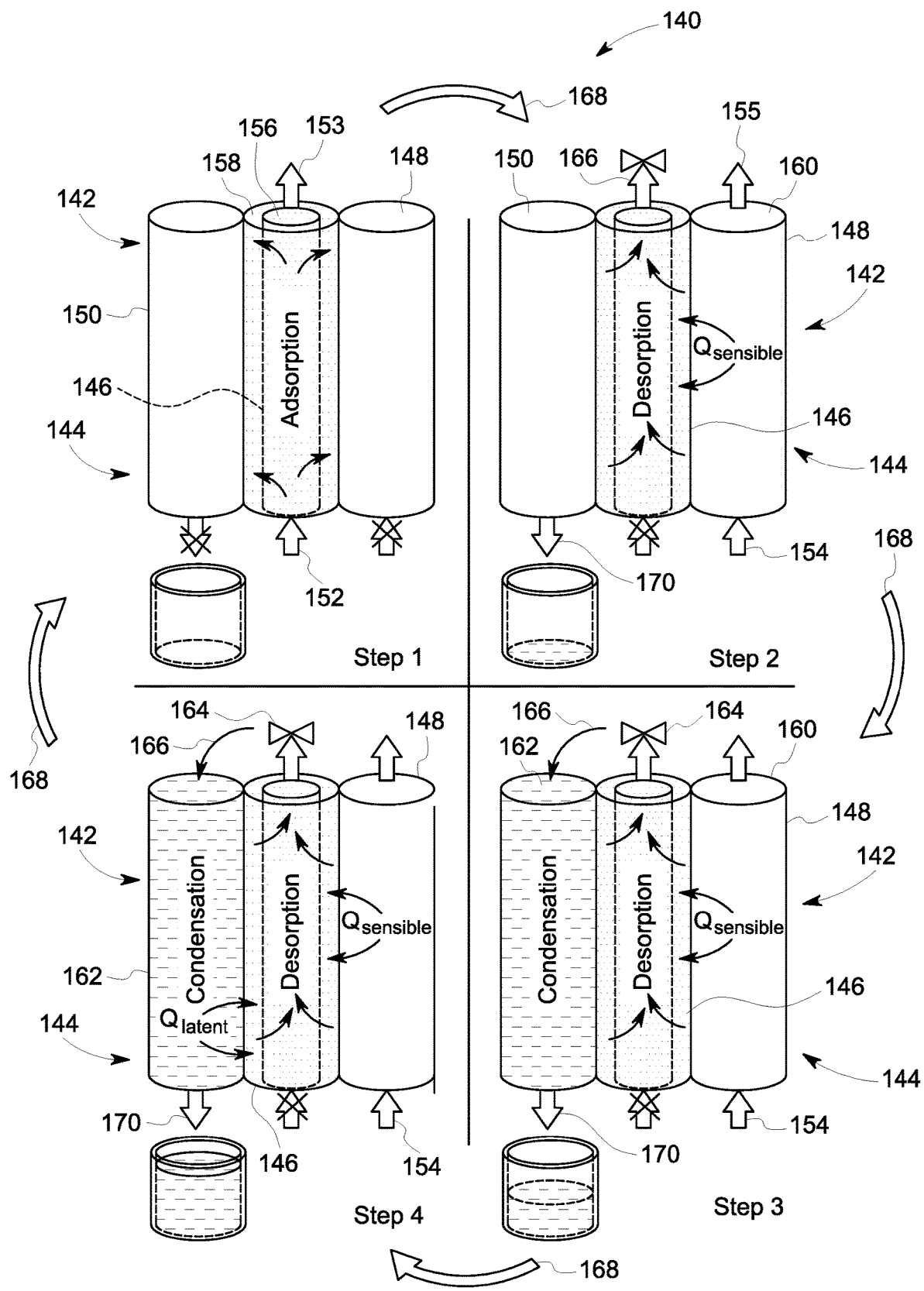
FIG. 3 is a schematic view of a water recovery cycle of the exemplary system for recovering water from a humidified inlet gas of FIGS. 1 and 2, in accordance with one embodiment of the present disclosure.

Referring now to FIG. 3, illustrated schematically is the geometry and cyclical operation 140 of a single contactor 142, generally similar to first or second contactor 112, 124, for use in the water recovery system 100 of FIGS. 1 and 2. The contactor 142 features a unique, trifurcating design that defines three fluidically-isolated, independent, massively parallel fluid domains, generally referenced 144. The parallel fluid domains include: (i) a first fluidically-isolated, sorbent-integrated, fluid domain 146; (ii) a second fluidically-isolated fluid domain 148; and (iii) a third fluidically-isolated fluid domain 150, each defining a fluid flow path, or channel, for the flow of a fluid. The term "fluidically-isolated" as used herein is intended to note isolation of the fluid through each domain from fluid in another domain, so as to prevent mixing of the fluids or direct contact therebetween. During an adsorption stage of operation, the first fluidically-isolated, sorbent-integrated, fluid domain 146 provides for flow of a first fluid stream 152, such as the humidified inlet gas stream 106 (FIGS. 1 and 2), and water adsorption. The second fluidically-isolated fluid domain 148 provides for flow of a second fluid stream 154, such as the hot gas stream 108 (FIGS. 1 and 2), to assist in desorption, during a desorption stage of operation, via transfer of heat to the first fluidically-isolated, sorbent-integrated, fluid domain 146. The third fluidically-isolated fluid domain 150 provides for capture of a condensate and recycling of latent heat of condensation back to the first fluidically-isolated, sorbent-integrated, fluid domain during the desorption stage of operation.

The first fluid domain 146 defines therein a sorbent-integrated channel, or flow path, 156 for flow of the first fluid stream 152, and more particularly the humidified inlet stream, and water adsorption. The second fluid domain 148 defines a second fluid stream channel, or flow path, and more particularly, a warming channel 160 to promote desorption via transfer of sensible heat to the sorbent-integrated channel 156, and more particularly, the first fluid domain 146. The third fluid domain 150 defines a condenser channel, or flow path, 162 to capture water condensate and efficiently recycle the latent heat of condensation back to the sorbent-integrated channel 156, and more particularly, the first fluid domain 146, to further drive desorption.

During operation, the first fluid stream 152, such as a humidified inlet gas (e.g. ambient air) is first directed through the sorbent-integrated channel 156, and more particularly, the first fluid domain 146. Here, moisture is adsorbed into a sorbent material 158 until the sorbent material 158 reaches its full water adsorption capacity. In an embodiment, the sorbent material 158 may comprise metal-organic frameworks (MOF), such as MOF-303; zeolites, such as SAPO-34, and Basolite A520, or the like. In an embodiment, the sorbent-integrated channel 156 may coated with the sorbent material 158, loaded/filled with the sorbent material 158 or formed/made of the sorbent material 158. In an alternate embodiment, the design may include fabrication of the contactor from a sorbent itself (e.g., using Binder Jet) and coating some of the contactor channels with a hydrophobic coating such as, a silica nano-coating, fluorinated silanes and fluoropolymer coatings, to prevent water re-adsorption by the sorbent during the regeneration/desorption cycle. As illustrated a dry gas stream 153 is output from the first fluid domain 146 subsequent to adsorption of the water from the inlet humidified gas stream, or the first fluid stream 152.

Desorption takes place within the contactor 142 in a Step 2, as illustrated. During this step, the first fluid stream 152 of humidified inlet gas flowing through the sorbent-integrated channel 156 is shut down (as indicated by "x") and a flow of hot gas, and more particularly the second fluid stream 154, is opened through the warming channel 160 defined by the second fluid domain 148 to provide desorption in the first fluid domain 146. In an embodiment, the second fluid stream 154 has a temperature that is greater than the first fluid stream 152. In a preferred embodiment, the second fluid stream 154 has a temperature greater than 85°

C. This drives an appropriate temperature gradient, to provide for the transfer of heat from the second fluid stream 154 to the sorbent material 158 in the first fluid domain 146, initiating desorption. A cooled output gas stream 155 is provided. As the sorbent-integrated channel 156 temperature reaches 85° C., the sorbent material 158 releases moisture in the form of water vapor 166, which is pulled from the first fluid domain 146 to the condenser channel 162, defined in the third fluid domain 150, in a Step 3. A fan 164 located in a heading of the contactor 142 aids in pulling the water vapor 166 from the first fluid domain 146, and more particularly to the condenser channel 162. In Step 3, the water vapor 166 is directed into the condenser channel 162 by the fan 164. The fan 164 raises the total pressure (0.2 bar positive pressure) in the condenser channel 162, which raises the partial pressure of the water vapor 166 to the point where the water vapor 166 is supersaturated and condenses on the walls of the condenser channel 162 and is output as purified water 170, generally similar to purified water stream 130 of FIGS. 1 and 2. In a Step 4, the latent heat that is released during condensation flows from the condenser channel 162 to the first fluid domain 146, and more particularly, the sorbent-integrated channel 156, thereby dramatically decreasing the heat energy required for desorption as the desorption process continues. Recycling the latent heat of condensation drives consistent, rapid desorption, and significantly drives process efficiency. It should be noted that, although depicted separately to ease explanation in FIG. 3, Steps 2-4 occur continuously in actual operation, and in a cyclical manner with Step 1, as indicated by arrows 168.

The water recovery system 100 of the present disclosure can comprise the at least one contactor, such as the contactor 142 of FIG. 3, with any well-known sorbent material for the sorbent material 158, such as MOFs, zeolites, or other hydrophilic materials. This system can utilize the sorbent material 158 and the contactor 142 at the appropriate partial pressure to absorb the water from the inlet humidified gas or first fluid stream 152.

The use of alternative cycling of two contactors, and namely the first contactor 112 and the second contactor 124 of FIGS. 1 and 2, for continuous moisture removal where each contactor has massively parallel fluid domains results in low pressure drop, and the separation of the fluids offers indirect heat exchange. The contactor can be manufactured using additive technology, such as, for instance, binder-jet techniques, or some other means of manufacturing. The described sorbent-integrated heat exchange that captures latent heat of condensation enables a fuel-efficient, two-cycle system architecture capable of generating potable water. The described system provides commercial advantages by providing the ability to operate in a wide range of air humidity and with low energy requirements. The technology can be deployed in remote areas, in military forward operation bases, and for disaster relief. Additional market opportunities may include consumer water supply, industrial water recovery, and desalination.

The various embodiments of the water recovery system as described hereinabove dramatically improves the ability to extract water from a humidified inlet gas, such as ambient air, at low air humidity levels utilizing less energy. The integration of a sorbent with a contactor and effective energy recuperation, and more particularly the transfer of sensible heat to the sorbent channel to assist with desorption, results in a system that includes low energy requirements and has the ability to operate at humidity levels typical for arid environments. By way of example, the use of a contactor trifurcated design enabling thermally enhanced recovery of water in the humidified inlet gas, reduces the cost of operation of the overall system. The use of alternative cycling of at least two contactors for continuous moisture removal where each contactor includes the trifurcating design, and more particularly includes massively parallel channels, results in low pressure drop and offers indirect heat exchange described hereinabove aids with effective energy recuperation in the water recovery system. The various embodiments of the water recovery system, and contactor design, described hereinabove therefore present a fuel-efficient, two-cycle system architecture that generates potable water.

The terminology used herein is for the purpose of describing particular embodiments only and is not intended to be limiting of the invention. Ranges disclosed herein are inclusive and combinable of the endpoints and all intermediate values of the ranges. "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Unless otherwise defined, all terms (including technical and scientific terms) used herein have the same meaning as commonly understood by one of ordinary skill in the art to which the embodiments of the invention belong. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A water recovery system comprising:
   a first fluid stream inlet providing for the flow of a first fluid stream into the water recovery system and a second fluid stream inlet providing for the flow of a second fluid stream into the water recovery system; and at least one contactor in fluid communication with the first fluid stream inlet and the second fluid stream inlet, the at least one contactor comprising:
- a first fluidically-isolated, sorbent-integrated, fluid domain for flow of the first fluid stream and water adsorption;
- a second fluidically-isolated fluid domain for flow of the second fluid stream, wherein the second fluidically-isolated fluid domain is in thermal communication with the first fluidically-isolated, sorbent-integrated, fluid domain; and
- a third fluidically-isolated fluid domain for capture of a condensate and recycling of latent heat of condensation back to the first fluidically-isolated, sorbent-integrated, fluid domain.

2. The water recovery system of claim 1, wherein the first fluidically-isolated, sorbent-integrated, fluid domain is a sorbent-coated channel.

3. The water recovery system of claim 1, wherein the first fluidically-isolated, sorbent-integrated, fluid domain comprises a channel filled with a sorbent material.

4. The water recovery system of claim 1, wherein the third fluidically-isolated fluid domain is in thermal communication with the first fluidically-isolated, sorbent-integrated, fluid domain.

5. The water recovery system of claim 1, wherein the at least one contactor comprises a first contactor in fluid communication with the first fluid stream inlet and the second fluid stream inlet and a second contactor in fluid communication with the first fluid stream inlet and the second fluid stream inlet, wherein the first contactor and the second contactor are configured to operate in alternative cycles for continuous operation.

6. The water recovery system of claim 5, wherein the first contactor is configured to operate as an adsorption unit when the second contactor operates as a desorption unit.

7. The water recovery system of claim 5, wherein the first contactor is configured to operate as a desorption unit when the second contactor operates as an adsorption unit.

8. The water recovery system of claim 1, wherein the first fluid stream is ambient air.

9. The water recovery system of claim 1, wherein the second fluid stream has a temperature of 85° C. or greater.

10. A water recovery system for removing water from a humidified inlet gas, comprising:
- a first fluid flow path providing for the flow of a first fluid stream into the water recovery system and a second fluid flow path providing for the flow of a second fluid stream into the water recovery system, wherein the first fluid stream comprises the humidified inlet gas, and the second fluid stream comprises a gas having a temperature greater than the humidified inlet gas;
- a first contactor in fluid communication with the first fluid flow path and the second fluid flow path and a second contactor in fluid communication with the first fluid flow path and the second fluid flow path, wherein the first contactor and the second contactor are configured to operate in alternative cycles for continuous operation, each of the first and second contactors comprising:
  - a first fluidically-isolated, sorbent-integrated, fluid domain for flow of the first fluid stream and water adsorption;
  - a second fluidically-isolated fluid domain for flow of the second fluid stream, wherein the second fluidically-isolated fluid domain is in thermal communication with the first fluidically-isolated, sorbent-integrated, fluid domain; and
  - a third fluidically-isolated fluid domain for capture of a condensate and recycling of latent heat of condensation back to the first fluidically-isolated, sorbent-integrated, fluid domain.

11. The water recovery system of claim 10, wherein the first fluidically-isolated, sorbent-integrated, fluid domain comprises a sorbent-coated channel.

12. The water recovery system of claim 10, wherein the first fluidically-isolated, sorbent-integrated, fluid domain comprises a channel filled with a sorbent material.

13. The water recovery system of claim 10, wherein the third fluidically-isolated fluid domain is in thermal communication with the first fluidically-isolated, sorbent-integrated, fluid domain.

14. The water recovery system of claim 10, wherein the first contactor is configured to operate as an adsorption unit when the second contactor is configured to operate as a desorption unit and the first contactor is configured to operate as a desorption unit when the second contactor is configured to operate as an adsorption unit.

15. The water recovery system of claim 10, wherein the first fluid stream is ambient air and the second fluid stream has a temperature of 85° C. or greater.

16. A method for removing water from a humidified inlet gas, comprising:
- providing a first contactor in fluid communication with a first fluid flow path and a second contactor in fluid communication with a second fluid flow path, wherein the first contactor and the second contactor are configured to operate in alternative cycles for continuous operation of a water recovery system;
- inputting a first fluid stream into the first fluid flow path of the water recovery system, wherein the first fluid stream comprises the humidified inlet gas;
- inputting a second fluid stream into the second fluid flow path of the water recovery system, wherein the second fluid stream comprises a gas having a temperature greater than the first fluid stream;
- operating the first contactor in fluid communication with the first fluid flow path in one of an adsorption cycle or a desorption cycle;
- simultaneously operating the second contactor in fluid communication with the second fluid flow path in the other of the adsorption cycle or the desorption cycle, providing continuous operation of the water recovery system, wherein each of the first and second contactors comprise:
- a first fluidically-isolated, sorbent-integrated, fluid domain for flow of the first fluid stream and water adsorption;
- a second fluidically-isolated fluid domain for flow of the second fluid stream, wherein the second fluidically-isolated fluid domain is in thermal communication with the first fluidically-isolated, sorbent-integrated, fluid domain; and
- a third fluidically-isolated fluid domain for capture of a condensate and recycling of latent heat of condensation back to the first fluidically-isolated, sorbent-integrated, fluid domain.

17. The method of claim 16, wherein the first fluidically-isolated, sorbent-integrated, fluid domain is a sorbent-coated channel.

18. The method of claim 16, wherein the first fluidically-isolated, sorbent-integrated, fluid domain comprises a channel filled with a sorbent material.

19. The method of claim 16, wherein the third fluidically-isolated fluid domain is in thermal communication with the first fluidically-isolated, sorbent-integrated, fluid domain.

20. The method of claim 17, wherein the first contactor is configured to operate as an adsorption unit when the second contactor is configured to operate as a desorption unit and the first contactor is configured to operate as a desorption unit when the second contactor is configured to operate as an adsorption unit.

* * * * *